United States Patent [19]

Heukensfeldt Jansen

[11] Patent Number: 5,689,116
[45] Date of Patent: Nov. 18, 1997

[54] SYSTEMS AND METHODS FOR CALIBRATING A GAMMA CAMERA

[75] Inventor: Floribertus Philippus Heukensfeldt Jansen, Brookfield, Wis.

[73] Assignee: General Electric Company, Milwaukee, Wis.

[21] Appl. No.: 658,381

[22] Filed: Jun. 5, 1996

[51] Int. Cl.[6] ................................................ G01T 1/164
[52] U.S. Cl. ............................ 250/363.09; 250/363.07
[58] Field of Search ........................ 250/252.1 R, 363.09, 250/363.07; 378/207

[56] References Cited

U.S. PATENT DOCUMENTS

| | | | |
|---|---|---|---|
| 4,223,388 | 9/1980 | Nishikawa et al. | 250/363.07 |
| 4,281,382 | 7/1981 | Knoll et al. | 250/363.07 |
| 4,298,944 | 11/1981 | Stoub et al. | 250/363.07 |
| 4,424,446 | 1/1984 | Inbar et al. | 250/252.1 |
| 4,429,226 | 1/1984 | Inbar . | |
| 4,517,460 | 5/1985 | Meulenbrugge et al. | 378/207 |
| 4,532,425 | 7/1985 | Abileah et al. | 250/368 |
| 5,345,082 | 9/1994 | Engdahl et al. | 250/363.09 |

*Primary Examiner*—Carolyn E. Fields
*Attorney, Agent, or Firm*—John S. Beulick; John H. Pilarski

[57] ABSTRACT

Methods and systems for calibrating a digital gamma camera using a hole phantom are described. In one embodiment, the method includes the steps of performing offset adjustments and gain adjustments, and then using a source to flood the hole phantom, image data of the phantom is collected by the camera to be calibrated. The image data collected from such flood is used to generate a light distribution function for the camera. In addition, residual distortions are measured, and a spatial corrections map and an energy deficit map are created. A quality control image also can be generated to verify that the camera is calibrated.

13 Claims, 4 Drawing Sheets

SYSTEMS AND METHODS FOR CALIBRATING A GAMMA CAMERA

FIELD OF THE INVENTION

This invention relates generally to gamma cameras and more particularly, to calibrating digital gamma cameras.

BACKGROUND OF THE INVENTION

Gamma cameras typically are used for locating and displaying abnormalities in human glands and organs. More specifically, and with respect to using a gamma camera, gamma-ray-emitting tracer material is administered to a patient, and the tracer material is more greatly absorbed by the abnormality to be detected than by the other tissues. The gamma camera generates data, or an image, representing the distribution of such tracer material within the patient.

A conventional gamma camera includes a scintillation crystal, or detector, responsive to radiation stimuli, i.e., gamma rays emitted by the patient. An array of photomultiplier tubes typically are positioned adjacent the crystal. In operation, the gamma rays emitted by the patient interact with the crystal, and light events occur within the crystal at locations where the rays interact with the crystal lattice structure. The photomultiplier tubes, in response to the light events, produce individual analog outputs. In digital gamma cameras, the analog photomultiplier tube outputs are supplied to analog-to-digital converters (ADCs) which convert the analog outputs to digital signals.

To generate an image, a representation of the distribution of events in the crystal is generated by utilizing a matrix of storage registers whose elements are in one-to-one correspondence with elemental areas of the crystal. The crystal elemental areas are identified by coordinates. Each time a light event occurs in the crystal, the event coordinates are identified and the register in the storage register matrix corresponding to the identified event coordinates is incremented. The contents of a given register in the matrix is a number that represents the number of events that have occurred within a predetermined period of time within an elemental area of the crystal. Such number is directly proportional to the intensity of radiation emitted from an elemental area of the radiation field. The number stored in the register therefore is used to establish the brightness of a display picture element corresponding to the crystal elemental area. The distribution of a radiation field is displayed in terms of the brightness distribution of the display.

Gamma cameras typically are calibrated to obtain good linearity and resolution. Calibration typically is required during manufacture of the camera, immediately after installation of the camera, and at regular intervals during the life of the camera. In addition, gamma cameras are calibrated nearly every time the camera detector head is repaired.

In spite of the regular need to calibrate a gamma camera, and in spite of the fact that such calibration often occurs in the field, known methods for calibrating gamma cameras are time-consuming and require considerable interaction between the camera system and a skilled operator. For example, one known calibration technique typically requires a skilled operator two days to complete. Of course, during such calibration, the camera cannot be used for normal imaging, and such two day downtime adversely affects both customer service and costs.

With respect to calibration accuracy, one known calibration technique at least attempts to determine light event position, or coordinates, in an energy-independent manner. In order to determine event position independent of event energy, the light spread function in the camera, i.e., the amount of light seen by each photomultiplier tube as a function of source position, must be known. To obtain the light spread function, a collimated point source mounted on an XY stage is moved to specific point locations around the face of the detector. Data is obtained from the photomultiplier tubes at every location. The digitized information from each photomultiplier tube is then histogrammed, and the camera light distribution function is derived from the result.

Practicing the above described calibration method in the field requires specialized, expensive hardware. In addition, such calibration method requires significant operator interaction and a significant amount of time to complete.

It would be desirable to reduce the amount of time required to calibrate a gamma camera yet permit calibration across the full energy range of the camera. It also would be desirable to calibrate a gamma camera more efficiently and less expensively.

SUMMARY OF THE INVENTION

These and other objects may be attained by methods for calibrating a digital gamma camera described herein. In one embodiment, the method includes the initial steps of obtaining an offset adjustment measurement and then using such offset measurement to remove any offset from a PMT signal, and performing gain adjustments on each PMT. The method further includes, in the one embodiment, generating a default light distribution function, and using such default distribution, a number images are generated from "floods" of a hole phantom. More particularly, a hole phantom is placed in front of the gamma camera to be calibrated and a radiation source is caused to flood the camera crystal. An actual light distribution function is then determined from the PMT signals by using the measured offsets and PMT gains. As a result of determining the actual light distribution function, the signal strength and associated noise for each PMT and for every source distance is known. This known information constitutes a full mapping of the light distribution function.

The method also includes the steps of, after determining the light distribution function, refining the positioning algorithm, and then measuring and correcting any residual distortions. More particularly, using the actual light distribution function for position calculation, a flood may be taken through a hole phantom to determine residual distortions. From this flood, a spatial corrections map can be generated.

The same data used to determine the spatial corrections map may also be stored separately to generate an energy map which represents energy deficit as a function of position. The energy map can be used to correct energy signals and thereby improve uniformity of the flood and energy resolution of the system. A quality control image may also be generated. Particularly, another flood can be taken through the phantom to ascertain that the distortions have been eliminated and that the energy map is flat across the image.

The above described method reduces the amount of time required to calibrate a gamma camera. Such method also enables calibrating a gamma camera more efficiently and less expensively.

DETAILED DESCRIPTION OF THE DRAWINGS

Figure 1:
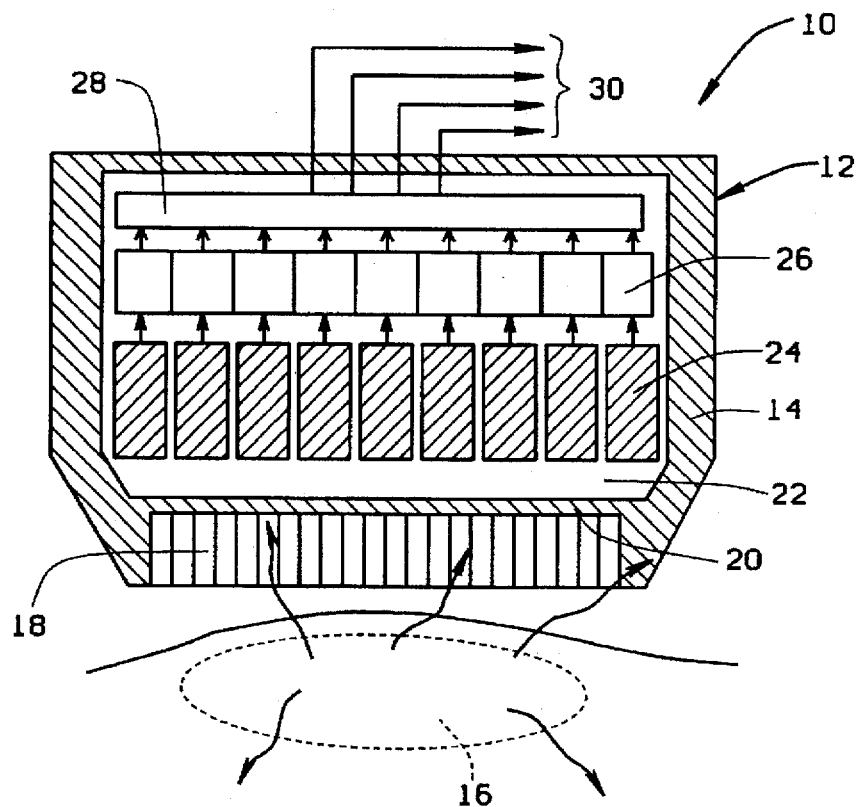
FIG. 1 is a cross-section schematic illustration of a gamma camera.

FIG. 1 is a cross-section schematic illustration of a gamma camera 10 including a detector head 12 having a housing 14 constructed of shielding material, such as lead or steel, for shielding the interior of head 12 from background radiation and from radiation within the patient's body, generally designated at 16, outside the field of view of detector head 12. Detector head 12 further includes a collimator 18 and a scintillation crystal 20. Collimator 18 transfers a gamma ray image of a radioactivity distribution from patient 6 onto scintillation crystal 20. Upon reception of gamma rays, a light event, or incident, occurs, thus causing scintillating crystal 20 to emit a light photon. The light photons emitted at the scintillation points in crystal 20 following its absorption of the individual gamma rays pass through a transparent light guide 22 and are shared among a closely-packed array of photomultiplier tubes (PMTs) 24. The total electric charge in the electrical pulses from the output of photomultiplier tubes 24 is proportional to the mean number of photons received by the photocathode of each photomultiplier tube 24. These pulses contain information on both the energy absorbed within crystal 20 from the gamma rays and the position of the scintillation point, or event. The pulses are then amplified and fed to analog-to-digital converters (ADCs) 26. In one embodiment, the signals from selected tubes 24 may be summed prior to being provided to ADCs 26. ADCs 26 convert the PMT analog outputs to digital signals, which are then processed by circuitry 28. Particularly, camera 10 produces signals on output lines 30 which are transmitted to a processing unit for generating an image for display on, for example, a cathode ray tube. The signals output on lines 30 also typically are stored in the memory of a computer (not shown).

The spatial resolution in the output of camera 10 is dependent upon the statistical distribution during photoelectron generation, acceleration and multiplication, in photomultiplier tubes 24. The statistical distribution contributes some spread to the size of the resulting output voltage pulse from each photomultiplier tube 24. This pulse size is directly proportional to the amount of energy received by crystal 20 and depends on the distance between a scintillation event and any photomultiplier tube (PMT) 24. Of course, any nonlinearities in the components of camera 10 affect the linearity and resolution of a resulting image.

Figure 2:
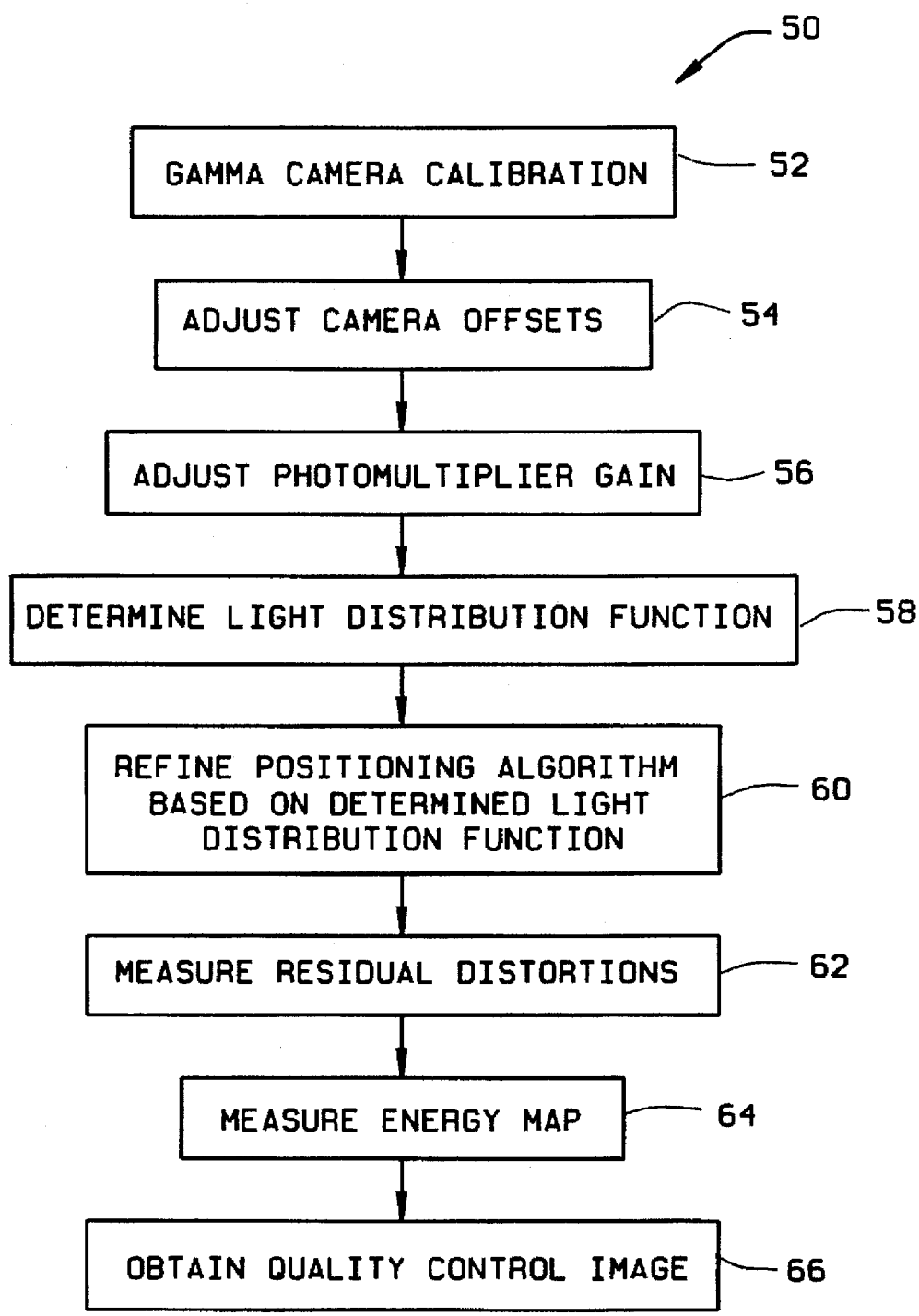
FIG. 2 is a flow chart illustrating process steps for calibrating a camera in accordance with one embodiment of the present invention.

A method 50 for calibrating camera 10 to compensate for camera non-linearities is illustrated in flow chart shown in FIG. 2. In performing gamma camera calibration 52 in accordance with method 50, an offset adjustment measurement 54 is obtained. Such adjustment can be performed by randomly triggering (i.e., enabling) ADCs 26 with no radiation source present. The signal generated when no source is present typically will indicate a low incident count rate, which is representative of normal levels of background radiation. A histogram of the readings obtained from ADCs 26 under such conditions typically will show a sharp peak at the true zero reading. Using this information, the offset can be determined. The offset can be compensated for digitally by digitally subtracting the offset from each measured value or electronically by subtracting a DAC-generated voltage from each signal prior to digitization, or by other known methods.

After making camera offset adjustment 54, gain adjustments 56 are performed on each PMT 24. Gain adjustments 56 may be performed using known techniques. Since image formation can only be performed using a light distribution function, and since image formation is required to perform PMT gain adjustment, a default light distribution function is used initially. For example, in accordance with one known gain adjustment method, a default light distribution function is generated for an individual PMT, and the default distribution function is approximated from the point source measurement. The point source measurement need only be performed once for each particular type of camera and can then be used in all such cameras. Rather than point source measurements, the default function can be derived from a simulation of the camera geometry. In any event, any errors introduced by use of the default function are corrected in subsequent processing.

Once the default light distribution function has been generated as described above, and using such default distribution, a number of "floods" are performed. More particularly, a phantom is placed in front of camera 10 and a radiation source is caused to flood camera crystal 20. One energy window is defined so that one image is based on events below the average energy peak of the radiation source, and another energy window is defined so that another image is based on events above the average energy peak. These images show the relative distribution of counts below and above the peak, which enables identification of PMTs having gains above and below average. This information can then be used to adjust individual PMT gains 56.

An actual light distribution function is then determined 58 by using the offset and PMT gains. The manner in which the actual function is determined is described hereinafter in more detail. As a result of determining the actual light distribution function, the signal strength and associated noise for each PMT 24 and for every source distance and orientation is known. This known information constitutes a full mapping of the light distribution function.

After determining the light distribution function 58, the positioning algorithm can be refined 60 according to known methods. Although the light distribution function 58 should provide good resolution and linearity, any approximations which may have been made for the sake of expediency (e.g., the response of each PMT 24 may be assumed to be the same to reduce the size of lookup tables), there may still be some residual distortions. These residual distortions can be eliminated through refinement of the function.

More specifically, once the positioning algorithm has been refined 60, residual distortions are measured and corrected 62. Using the actual light distribution function for position calculation, a flood may be taken through a hole phantom to determine residual distortions. From this flood, a spatial corrections map can be generated.

The same data used to determine the spatial corrections map may also be stored separately to generate an energy map 64 which represents energy deficit as a function of position. The energy map can be used to correct energy signals and thereby improve uniformity of the flood and energy resolution of the system.

A quality control image 66 is then generated. Particularly, another flood can be taken through the phantom to ascertain that the distortions have been eliminated and that the energy map is flat across the image.

Calibration method 50 described above may be repeated after every maintenance operation. Since no operator intervention is required to practice method 50, such method 50 eliminates a need for operator intervention. In addition, and in one embodiment, method 50 requires only a single hole phantom and source for calibration. Therefore, use of expensive and cumbersome robotics is eliminated.

Method 50 is described above in the context of signals from individual PMTs 24. It should be understood, however, that a combination of signals from selected PMTs can be used in determining the light distribution function. For example, how the output of a linear determine how the output of a linear combination of signals from various PMTs 24 change with distance to the source location.

Figure 3:
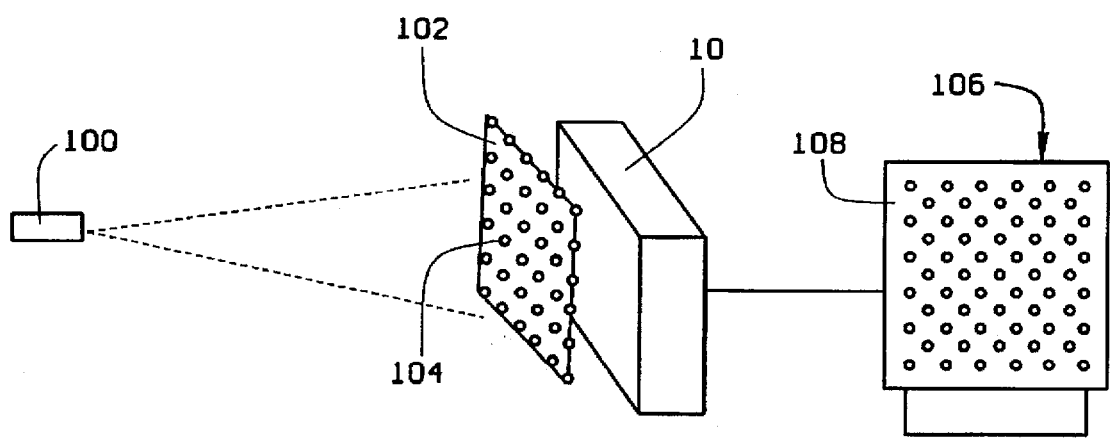
FIG. 3 is a block diagram illustrating a radioactive source flooding a gamma camera detector.

Set forth below is a more detailed discussion of executing light distribution function determination step 58 of method 50. The present invention is directed to determination step 58 in that the other steps of method 50 are well known by those skilled in the art. More specifically, and with respect to step 58, FIG. 3 is a block diagram illustrating a radioactive source 100 flooding gamma camera 10. Radiation source 100, which may be Cobalt (Co-57), Technetium (Tc-99), or some other single peak isotope, is placed in front of camera 10. A phantom 102 is placed between camera 10 and radiation source 100. Phantom 102 is illustrated as a hole phantom, i.e., phantom 102 has circular shaped openings 104 therein spaced in a regular pattern. Openings 104 could, of course, have many other geometric shapes and could be an array of openings or an array of lines. Phantom 102 also could be composed of two separate phantoms having, for example, lines in the two orthogonal directions. Phantom 102, alternatively, could be a one-dimensional phantom for generating a generic light distribution function which is assumed to be identical for different rows and columns of PMTs 24. Functionally, phantom 102 facilitates associating parts of the image with the collected data. In one embodiment, phantom 102 is a lead plate, approximately 3 mm thick, perforated with a hexagonal array of openings 104 1 mm in diameter. Openings 104 are spaced so that openings 104 are resolved individually. Typically, individual resolution occurs at twice the intrinsic spatial resolution of camera 10, e.g., at about 8 mm. Camera 10 is connected to a computer 106 including a display 108. An image of phantom 102 is shown on display 108.

Figure 4:
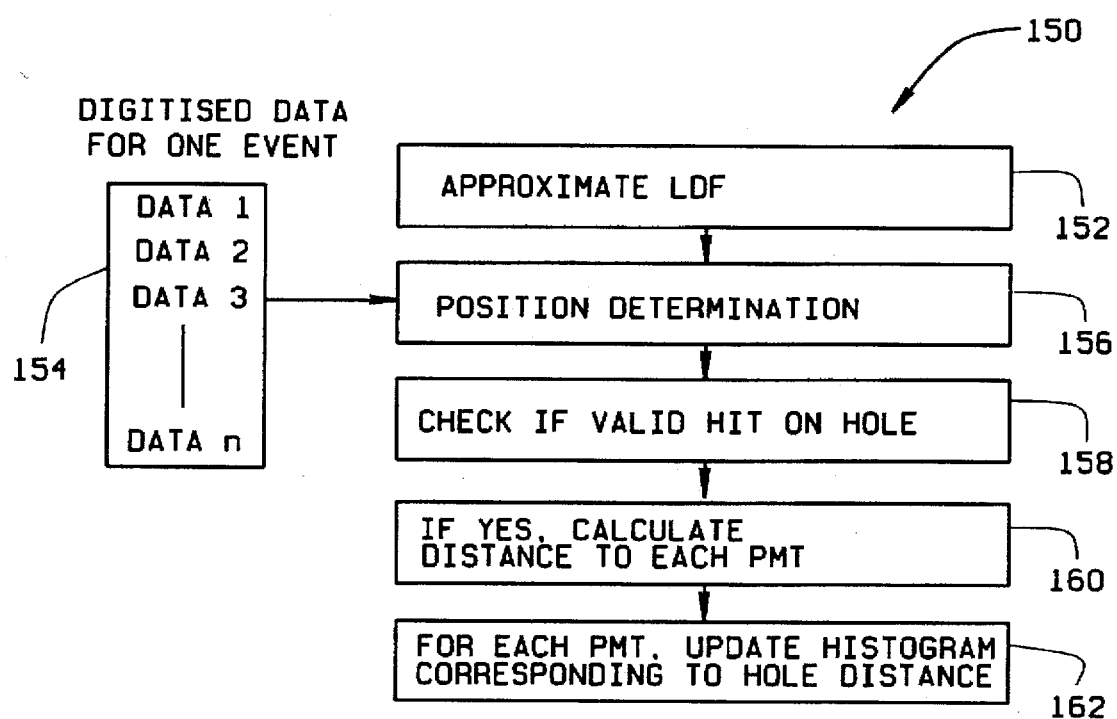
FIG. 4 is a flow chart of a method for determining an actual light distribution function in accordance with one embodiment of the present invention.

With the set-up illustrated in FIG. 3, the actual light distribution function is determined in accordance with a process 150 illustrated in flow chart form in FIG. 4. Initially, the approximate light distribution function (LDF) 152 is available. Using the approximate LDF, an image of the hole phantom is obtained by flooding phantom 102 using source 100. Since the estimated LDF is being used, the image will have distortions but should allow resolution of individual openings. The image data obtained is stored in a memory 154 of computer 106.

Once the image data is obtained, then the positions of individual openings in the image are determined 156 and correspondence between each opening 104 in phantom 102 with each opening in the image is established. In order to establish such correspondence, it may be helpful if the opening spacing in phantom 102 is irregular in that such spacing is wider near the edge of the field of view of camera 10. The opening spacing cannot be too large, however, since such spacing could result in incomplete information for distortion measurements.

After position determinations 156, "hit" areas are also determined 158 for each opening. Particularly, in determining hit areas, those pixels in the image which correspond to radiation having gone through a particular opening 104 in phantom 102 are identified. A hit map is generated showing each opening 104 the radiation went through when it "hits" a particular pixel. Areas in which an event cannot be attributed to any opening 104, i.e., "not sure" areas, are discarded for purposes of determining "hits". For each valid hit, the distance from the light event to a corresponding PMT 24 is calculated 160.

More events are then acquired through phantom 102. If additional source data is not obtained, unprocessed PMT data may be used to generate more events. In any case, for each individual light event, one of phantom openings 104 corresponding to such event is identified. Then, given the relative position of corresponding opening 104 to each PMT 24 (or group of PMTs 24), and because the source—PMT distance for each PMT 24 is determinable, a histogram of the signal strength received by each PMT 24 is created 162 to determine the statistics for every PMT 24 and every distance. The histograms are then used to generate the actual light distribution function 58.

Figure 5:
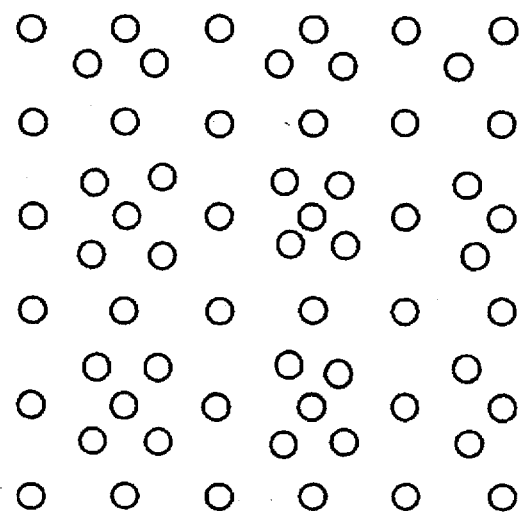
FIG. 5 is a pictorial view of an image reconstructed by flooding a phantom.

FIG. 5 is a pictorial view of an image reconstructed by flooding a phantom. The image has poor linearity and is representative of an image generated using an approximate LDF. Although there is poor linearity, openings can be distinguished and the image can be used to create a lookup mask. Specifically, every circle corresponds to a "hit" area, and events in the blank area are discarded. The shape of hit areas may be different depending on the phantom used, e.g., the hit areas may be lines, circles or arbitrary shapes.

Figure 6A:
FIGS. 6A–F are signal strength versus event charts.
Figure 6B:
Figure 6C:
Figure 6D:
Figure 6E:
Figure 6F:

FIGS. 6A–F are signal strength versus event charts, or histograms. In each chart, the horizontal axis corresponds to signal strength received at each PMT and the vertical axis corresponds to the number of events within that signal strength. FIG. 6A represents the signal strength for an event occurring at 0 mm from one of PMTs 24. FIG. 6B represents the signal strength for an event occurring 10 mm from one of PMTs 24. FIG. 6C represents the signal strength for an event occurring 20 mm from one of PMTs 24. FIG. 6D represents the signal strength for an event occurring 30 mm from one of PMTs 24. FIG. 6E represents the signal strength for an event occurring 40 mm from one of PMTs 24. FIG. 6F represents the signal strength for an event occurring 50 mm from one of PMTs 24. The histogram data constitutes a full mapping of the actual light distribution function.

Method 50, including method 150, described above are effective for single energy operations. Such methods 50 and 150 can also be used to obtain uniform floods across the full energy range of camera 10. As is known, the light distribution of camera 10 varies slightly as a function of energy because the average depth of interaction of the radiation in crystal 20 changes with energy, i.e., higher energy radiation will generally penetrate more deeply into crystal 20. If such changes are not taken into account, images at higher energies generally appear to have hot tube centers because, on average, the radiation interacts closer to one of PMTs 24 resulting in the light spread function being more peaked.

More specifically, and as explained above, the changing behavior of the light distribution as a function of crystal depth is quite a small effect, and it is mostly a function of the crystal stopping power, which is invariant across the detector, and the thickness of lightguide 22 and the size of PMT 24, which also are invariant across the detector. Therefore, the change in light distribution function typically needs only to be measured once. Once such change is measured, the change can be applied as a delta, or difference, to any measured distribution function to obtain the correct function for every energy.

Further, once a camera has been fully tuned and corrected at one energy, any non-uniformity in a flood image at energies other than the energy at which tuning was performed is caused by differential positioning errors, i.e., distortions. With respect to obtaining the light distribution function at the other energy levels, the following steps can be performed. Specifically, once camera 10 is fully corrected at the one energy level, phantom 102 is removed. Camera 10 is then flooded with isotopes of different energies. For each energy level of interest, a uniformity flood is performed. The residual distortion is determined from the integral of the uniformity distribution. A series of imaginary hit areas is then created in the flood image. That is, even though no phantom is present, imaginary hit areas are designated. For each hit area, the actual distance to each PMT 24 is calculated based on the image distance corrected by the residual displacement error previously determined. The series of events are then processed as described above, and a new signal size histogram is created based on the hits in each of the arbitrary, or imaginary, hit areas. This data is then used to generate the light distribution function at the new energy of interest.

Once the above steps have been performed for each energy level of interest, the various light distribution functions can be used when an event occurs at a particular energy. Specifically, for any particular energy, the light distribution functions determined as described above can be interpolated to provide the light distribution function for that particular energy.

With respect to distortions, in the case of a one-dimensional distortion, the positioning displacement can be derived from the non-uniformity by integrating the differential non-uniformity. Such one dimensional distortions occur in cameras in which PMTs are aligned along an orthogonal grid. In cases where two dimensional distortions must be considered, a good approximation to the distortions can be calculated by determining the local gradient of the uniformity. This gradient is approximately proportional to the displacement error.

In either the one dimensional or two dimensional distortion case, it is possible to determine the residual displacement errors by taking a flood at each energy of interest. Using the image data obtained from such flood, the data can be used to generate a secondary spatial corrections map, or "delta table," valid for each energy, or to determine the error in the light distribution function given the error in the positioning for a given distance to each PMT 24.

With respect to generating the delta table, the delta table can be merged with the original spatial correction obtained using a phantom at the baseline energy, which typically is 140 keV. The delta correction is maintained as a separate entity, and whenever camera 10 needs to be recalibrated, corrections are generated for each of the other energies using the delta correction. The delta correction describes the difference between corrected floods at different energies, and these differences are constant for a given camera 10.

More specifically, and for the delta correction, once residual distortions of a flood have been determined, the delta correction can be calculated from the integral of the non-uniformity. For a camera fully corrected at one energy, the spatial corrections at this one energy are referred to here as the base correction. The difference between the base correction and the spatial correction required at another energy is referred to here as the delta correction, and the correction generated by applying the delta correction to the base correction is referred to here as the secondary correction.

To generate the delta correction and apply it to the base correction, the following steps are executed. Specifically, the average density ($I_{av}$) of an image along the direction in which the distortions are to be calculated is determined. For each point along the line, the fractional deviation from the average, $f=(I-I_{av})/I_{av}$, is calculated. Smoothing this function is required to obtain acceptable flood uniformity with typical image statistics. The choice of smoothing algorithm dictates the highest spatial frequency artifact that can be removed with this method. The integral f dx along the line is then calculated. This is the additional displacement required at each point along the line in order to obtain good uniformity. The constant of integration is provided by setting an arbitrary point of the displacement equal to zero, e.g., stipulate that the center of the image should not move.

The new spatial correction can then be determined by:

1. for each point in the uncorrected image, determine which point in the correct image map to it,
2. identify the additional displacement (using interpolation in both the X and Y direction as appropriate) at that point as determined above,
3. add this additional displacement to the original correction fact, and
4. repeat the foregoing steps for every point in the uncorrected image space.

The above described method provides a new spatial correction valid for a higher energy. If the base correction needs to be updated (e.g., as will have to be done periodically to maintain peak performance of the camera), it should be possible to generate new secondary corrections without obtaining new delta correction. That is, the difference between the base and secondary correction is expected to remain constant over the life of the detector. If such difference does not remain constant, then another delta correction can be obtained.

To further an understanding of the above described delta correction, and referring to FIG. 7, a calculation in a one-dimensional case is explained below. Specifically, in FIG. 7, the top row of boxes represents pixels in the uncorrected image, i.e., the starting point for lookup of spatial correction values. Mapping into the corrected image is performed on the basis of lookup in this coordinate system. The second row of boxes represents pixels in the base, or corrected, image. The delta corrections are obtained in this coordinate system and therefore, it is in this system that the values need to be looked up. The third row of boxes represents pixels in the secondary corrected image. The delta correction is applied on top of the base correction to obtain the final secondary correction. The vector shown as the sum of the base correction and delta correction gives the secondary correction that would be mapped into the pixel of the uncorrected image from which it originates.

Figure 7:
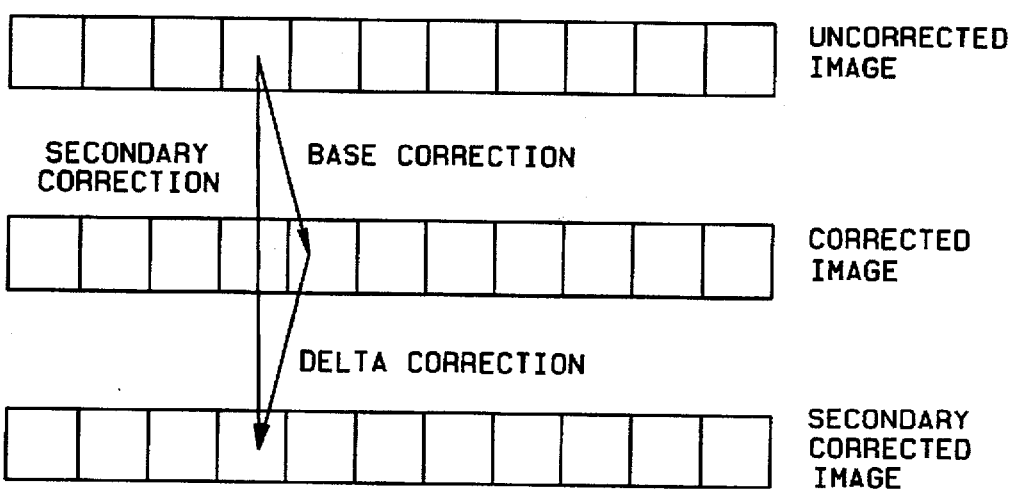
FIG. 7 illustrates a delta correction.

The following is a mathematical expression, in two dimensions, of the correction illustrated in FIG. 7. Specifically, if the original event occurs at (X,Y), the base correction displaces the event to (X', Y') according to:

$$(X', Y')=(X, Y)+\text{basecor}(X, Y)$$

The delta correction can the be looked up in the (X',Y') space, to yield the true position (X", Y"):

$$(X'', Y'')=(X', Y')+\text{delta}(X', Y').$$

Finally, the secondary correction is expressed as secondary (X, Y)=(X"−X, Y"−Y).

With respect to the position determination algorithm, such algorithm selects the appropriate curve based on approximate energy as determined from the sum of all PMT signals to use for each event. This will optimize the spatial registration across the full energy range, and render the floods uniform at all energies. An advantage of incorporating PMT geometry into the algorithm is that it causes the floods to look identical across the different energy levels before corrections are applied, which makes it easier to work with just a single set of energy corrections. Specifically, as the energy correction table is entered with the uncorrected position, any error in registration between energies will cause the wrong correction value to be returned. If uncompensated, such wrong correction value might force multiple energy correction.

The above described calibration methods are believed to reduce the amount of time required to calibrate a gamma camera yet permit calibration across the full energy range of the camera. Such methods also result in calibrating a gamma camera more efficiently and less expensively.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the gamma camera described herein is a digital camera. Many other cameras may be used. Accordingly, the spirit and scope of the invention are to be limited only by the terms of the appended claims.

What is claimed is:

1. A method for operating a gamma camera, the gamma camera including a scintillation crystal responsive to radiation stimuli for producing light events in the crystal at locations where the stimuli interact with the crystal and an array of photomultiplier tubes which responds to the light events for producing individual electrical signal outputs, the camera further including a plurality of analog-to-digital converters for converting the electrical signal outputs from the photomultiplier tube array to digital signals, said method comprising the steps of:

obtaining image data by performing at least one flood exposure using a phantom having a plurality of openings;

determining positions of individual openings as represented in the image data;

corresponding the image data representative of the openings to actual openings in the phantom;

generating a hit map generating a histogram representative of signal strength received, and distance from, an event for at least one photomultiplier tube; and determining residual displacement errors by performing flood exposures at selected energy levels.

2. A method in accordance with claim 1 wherein said method further comprises the steps of:

obtaining an offset adjustment measurement of the camera; and performing gain adjustments on photomultipliers of the camera photomultiplier tubes array.

3. A method in accordance with claim 1 wherein said method further comprises the steps of:, refining a positioning algorithm used in generating an image from the image data collected by the camera; and measuring residual distortions in the image generated from the collected image data.

4. A method in accordance with claim 3 wherein said method further comprises the steps of:

generating a spatial corrections map;

generating an energy deficit map; and obtaining a quality control image.

5. A method in accordance with claim 1 further comprising the step of generating a secondary spatial corrections map valid for each selected energy level.

6. A method in accordance with claim 1 further comprising the step of determining an error in the light distribution function for each selected energy level.

7. A system for operating a gamma camera, the gamma camera including a scintillation crystal responsive to radiation stimuli for producing light events in the crystal at locations where the stimuli interact with the crystal and an array of photomultiplier tubes which responds to the light events for producing individual electrical signal outputs, the camera further including a plurality of analog-to-digital converters for converting the electrical signal outputs from the photomultiplier tube array to digital signals, said system comprising:

a radioactive source;

a phantom having a plurality of openings located in front of the camera and between the camera and said radioactive source; and a computer coupled to the camera, said computer programmed to:

obtain image data from a flood exposure of the phantom;

using the obtained image data, determine a light distribution function for the camera; and determine residual displacement errors from image data collected from collected from flood exposures performed at selected energy levels.

8. A system in accordance with claim 7 wherein said computer is further programmed to:

obtain an offset adjustment measurement of the camera; and perform gain adjustments on photomultiplier tubes of the camera photomultiplier array.

9. A system in accordance with claim 7 wherein said computer is further programmed to:

refine a positioning algorithm used in generating an image from the image data collected by the camera; and measure residual distortions in the image generated from the collected image data.

10. A system in accordance with claim 9 wherein said computer is further programmed to:

generate a spatial corrections map;

generate an energy deficit map; and generate a quality control image.

11. A system in accordance with claim 7 wherein to determine the light distribution function, said computer is programmed to:

determine positions of individual openings as represented in the image data;

correspond the image data representative of the openings to openings in the phantom;

generate a hit map; and generate a histogram representative of signal strength received, and distance from, an event for at least one photomultiplier tube.

12. A system in accordance with claim 7 wherein said computer is further programmed to generate a secondary spatial corrections map valid for each selected energy level.

13. A system in accordance with claim 7 wherein said computer is further programmed to determine an error in the light distribution function for each selected energy level.

* * * * *